United States Patent
du Quesne

(10) Patent No.: US 8,590,590 B2
(45) Date of Patent: Nov. 26, 2013

(54) MACHINE FOR FITTING AND REMOVING TIRES

(76) Inventor: Bertrand du Quesne, Schaerbeek (BE)

(*) Notice: Subject to any disclaimer, the term of this patent is extended or adjusted under 35 U.S.C. 154(b) by 497 days.

(21) Appl. No.: 12/898,977

(22) Filed: Oct. 6, 2010

(65) Prior Publication Data

US 2011/0083812 A1 Apr. 14, 2011

(30) Foreign Application Priority Data

Oct. 8, 2009 (EP) .................................... 09172581

(51) Int. Cl.
| | |
|---|---|
| *B60C 25/135* | (2006.01) |
| *B60C 25/00* | (2006.01) |
| *B60C 25/04* | (2006.01) |
| *B60C 25/132* | (2006.01) |
| *B60B 30/00* | (2006.01) |

(52) U.S. Cl.
USPC ......... 157/1.24; 157/1.26; 157/1.3; 157/1.36; 157/1.37; 157/11; 157/14; 157/21

(58) Field of Classification Search
USPC .......... 157/1.24, 1.26, 1.3, 1.36, 1.37, 11, 14, 157/21
See application file for complete search history.

(56) References Cited

U.S. PATENT DOCUMENTS 4,884,611 A * 12/1989 Schmidt ....................... 157/1.24

FOREIGN PATENT DOCUMENTS

| EP | 0 649 763 A | 4/1995 |
| EP | 0 909 667 A | 4/1999 |
| EP | 1 529 666 A | 5/2005 |

OTHER PUBLICATIONS

English language Abstract for EP 1529666.
English language Abstract for EP 0649763.
English language Abstract for EP 0909667.

* cited by examiner

*Primary Examiner* — Monica Carter
*Assistant Examiner* — Danny Hong
(74) *Attorney, Agent, or Firm* — Christopher Casieri

(57) ABSTRACT

A machine for fitting and removing a tire (1) from a rim (2) of a wheel (3). The machine comprises a frame (10), a rotating table (11) for attaching the wheel to and for rotating the rim about its axis (Y), and a tool for fitting and/or removing the tire from the rim. The machine also comprises a lever (12) to which a pressure element (13) is attached in order to push the bead (6) of the tire toward a circumferential recess of the rim. The lever (12) is connected to the frame (10) and comprises a first articulation in order to bring a pressure element (13) closer to or further from the axis (Y), and a second articulation in order to bring the pressure element (13) closer to or further from a central plane (PC) perpendicular to the axis (Y) and passing through the center (D) of the rim (2).
The first articulation is situated at a location such that the friction force of the tire on the pressure element (13) when the tire is in rotation will result in a centripetal force on the pressure element (13), thus reducing the force to be exerted on the lever (12).
The second articulation is situated at a location such that said friction force will result in a force on the pressure element (13) directed toward the central plane (PC), thus also reducing the force to be exerted on the lever (12).

12 Claims, 4 Drawing Sheets

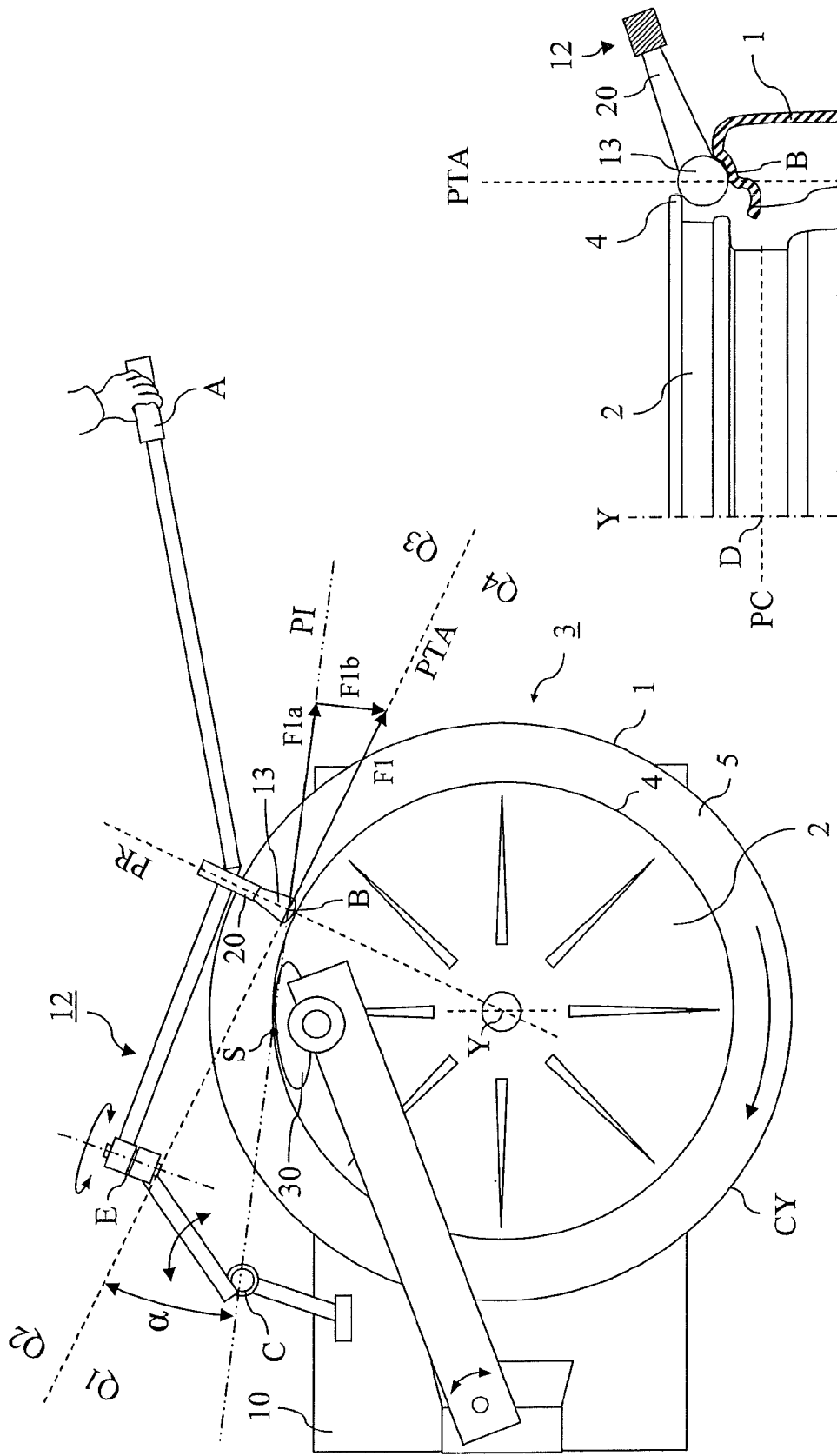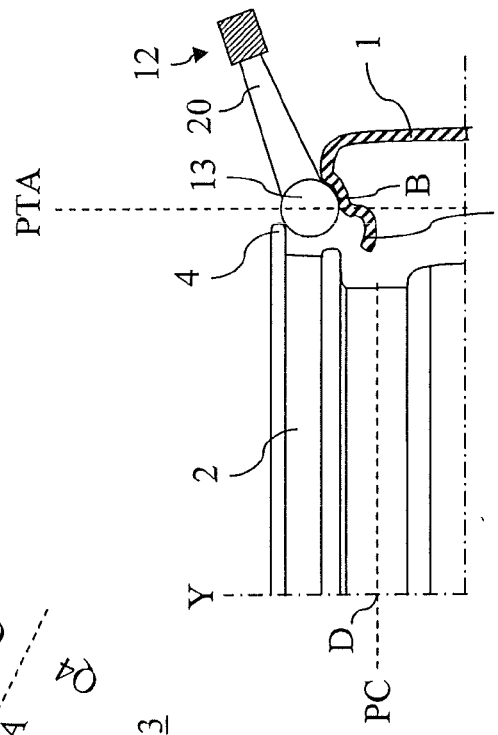
Fig. 4
Fig. 5

MACHINE FOR FITTING AND REMOVING TIRES

CROSS-REFERENCE TO RELATED APPLICATION

The present patent application claims the right of priority under 35 U.S.C. §119 (a)-(d) of European Patent Application No. EP 09172581.2, filed Oct. 8, 2009.

BACKGROUND OF THE INVENTION

1. Field of the Invention

The invention relates to a machine for fitting and removing a tire from a rim of a wheel, comprising a frame, a table capable of having the rim attached thereto and of rotating said rim in a centered manner about an axis (Y) and a lever articulated on the frame, said lever comprising a control point (A), a pressure element designed to exert a pressure on a bead and/or a wall of the tire at a working point (B) of the tire, a first articulation about a point (C) in order to bring the pressure element closer to or further from the axis (Y), and a second articulation about a point (E) in order to bring the pressure element closer to or further from a central plane perpendicular to the axis (Y) and passing through a center (D) of the rim.

2. Prior Art

Such machines have been known for a long time and make it possible to fit and/or remove a tire from a rim, for example of a wheel of a motor vehicle or a truck or of a motorcycle. To carry out this operation, the wheel is first attached to the table so that its axis coincides with the axis of rotation (Y) of the table. A tool for fitting/removing the tire is then brought over the rim in order to position it close to an edge of the rim. The user then removes and/or fits the tire in a known manner.

During the operation for fitting or removing the tire, it is known that it is appropriate to keep the bead of the tire in a circumferential recess of the rim in order to be able to have said bead pass over the edge of the rim at the fitting/removal tool.

In order to keep the bead of the tire in this position, patent EP 909667 discloses such a machine comprising a lever that is articulated and actuated by an operator. The operator begins by bringing the pressure element into its working position (B) on the wall or on the bead of the tire. Then, by actuating the lever, the operator can push and keep the bead of the tire in the circumferential recess of the rim during the operation for fitting or removing the tire.

Patent EP 909667 also discloses that the lever allows the operator—during a removal operation and after having taken the top bead of the tire out of the rim—to make the bottom bead of the tire (and therefore the tire) rise to the top edge of the rim by placing the pressure element under the bottom wall of the tire and by pulling the lever up.

Although such known devices operate well, the operator must however exert a certain force on the lever so that the pressure element is held at its working point and/or so that it exerts its effect on the tire during the operation for fitting or removing the tire.

SUMMARY OF THE INVENTION

For the purposes of the present application, the following planes and volumes are defined:
  a radial plane (PR) comprising the axis (Y) and passing through the point (B),
  a tangential plane (PTA) parallel to the axis (Y), perpendicular to the radial plane (PR) and comprising the point (B),
  the radial plane (PR) and the tangential plane (PTA) define four successive spatial quadrants (Q1,Q2,Q3,Q4) of which the first quadrant (Q1) is that immediately following the axis (Y) in the direction of rotation of the rim.

One object of the invention is to provide a machine for fitting and removing tires by virtue of which less force needs to be exerted on the lever during the fitting or removal of the tire.

For this purpose, the machine according to the invention is characterized in that in that the point (C) is in the first quadrant (Q1) or in the third quadrant (Q3).

Specifically, when the point (C) is in such a position, the friction force that the tire exerts on the pressure element, when the latter is in its working position (B) and when the tire is rotating about the axis (Y), will result in a centripetal force on the pressure element. The force that needs to be exerted on the lever to keep the pressure element in the working position will therefore be reduced.

In an extreme case, no external force needs to be exerted on the lever after the pressure element has been placed in working position between the edge of the rim and the bead or the wall of the tire.

Preferably, the machine according to the invention is characterized in that the point (C) is in the first quadrant (Q1).

Specifically, the lever will therefore only be set in tension following said friction force and not in compression as would be the case if the point (C) was in the third quadrant (Q3). This makes it possible to reduce the risk that the pressure element becomes jammed against the rim and/or makes it possible to prevent jerks in the lever when the wheel is made to rotate.

For the purposes of the present application, the following planes and spaces are furthermore defined when the wheel is mounted on the table:
  a first transverse plane (PTR1) comprises a circle formed by a proximal rim edge (relative to the table);
  a second transverse plane (PTR2) comprises a circle formed by a distal rim edge (relative to the table);
  the radial plane (PR) and the first transverse plane (PTR1) define four successive spatial quadrants (U1, U2, U3, U4) of which the first quadrant (U1) is that situated on the side of the center (D) of the rim and on the side opposite to a frication force (F1) between the pressure element (13) and the tire when the machine is in operation.

According to a particular embodiment, the machine according to the invention is characterized in that the point (E) is in the first quadrant (U1) or in the third quadrant (U3) when the pressure element is in its working position (B).

Specifically, when the point (E) is in such a position, the friction force (F1) that the tire in rotation exerts on the pressure element when the latter is in a working position (B) on the bead and/or the wall of the tire which is on the side of the table, will result in a force on the pressure element which will be directed toward the central plane (PC).

Therefore, the force that needs to be exerted on the lever to move the bottom bead of the tire (and therefore the tire) to the level of the top edge of the rim during a removal operation and after having taken the top bead of the tire out of the rim, will be reduced. Preferably, the machine according to the invention is characterized in that the point (E) is in the first quadrant (U1) when the pressure element is in its working position (B).

Specifically, the lever will therefore only be placed in tension following said friction force and not in compression as would be the case if the point (E) was in the third quadrant (U3). This makes it possible to reduce the risk that the pressure element becomes jammed and/or makes it possible to prevent jerks in the lever when the wheel is set in rotation.

In the most preferred manner, the machine according to the invention is characterized in that the point (C) is in the first quadrant (Q1) and in that the point (E) is in the first quadrant (U1) when the pressure element is in its working position (B).

BRIEF DESCRIPTION OF THE FIGURES

These aspects and other aspects of the invention will be clarified in the detailed description of the particular embodiments of the invention, with reference being made to the drawings of the figures, in which:

FIG. 4 shows schematically a front view of a preferred embodiment of a machine according to the invention;

FIG. 5 shows schematically a view in partial section along the radial plane (PR) of a machine according to the invention;

The drawings of the figures are not to scale.

In general, similar elements are indicated by similar reference numbers in the figures.

DETAILED DESCRIPTION OF PARTICULAR EMBODIMENTS

Figure 1:
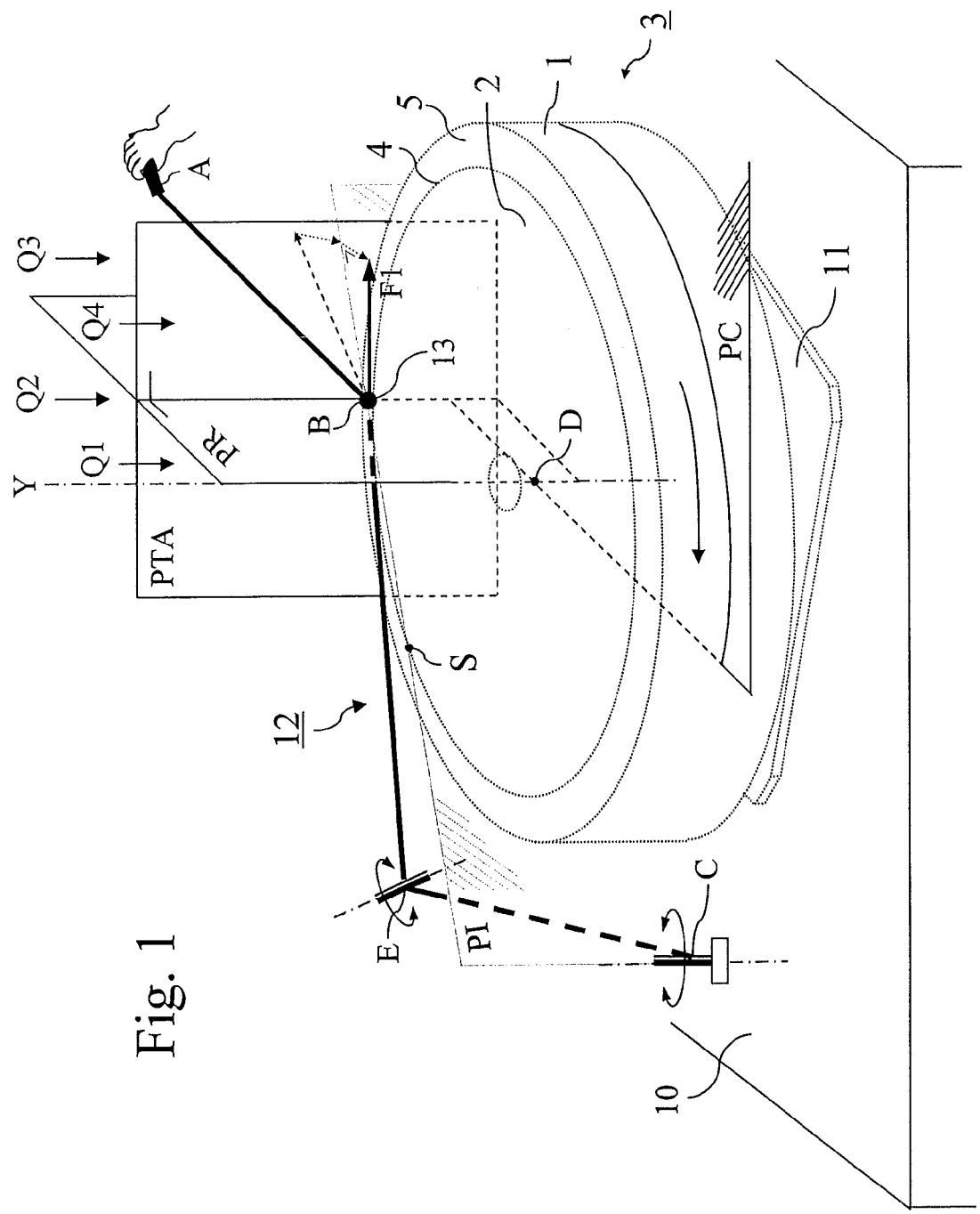
FIG. 1 shows schematically a view in perspective of a machine according to the invention.

FIG. 1 shows schematically a view in perspective of an exemplary embodiment of the machine according to the invention. So as not to clutter the drawing, this figure shows only the important portions of the machine, the other portions otherwise being well known.

The machine comprises a fixed frame (10) and a rotary table (11) to which a wheel (3) can be attached in a centered manner relative to the axis of rotation (Y) of the table (11). Usually, it is the rim (2) of the wheel that is attached to the table (11), so that the wheel will be rotated about the axis (Y) when the table (11) is rotated about this same axis.

For reasons of making the present description easier, the axis (Y) of the table (11) is a vertical axis. However, the invention is not limited to such a configuration and it should be understood that the axis (Y) of the table (11) may have any other orientation in space, such as for example a horizontal orientation.

The machine also comprises a lever (12) connected in an articulated manner to the frame (10). In the example of FIG. 1, said lever (12) comprises several portions as described in the following order, beginning from the frame:
- a first articulation (C) secured to the frame (10);
- a first arm connecting the first articulation (C) to a second articulation (E);
- a second arm connecting the second articulation (E) to a control part at a control point (A) and on which the operator or the actuator (in this instance represented by a hand) can act in order to actuate the lever (12);
- a pressure element (13) mounted on the second arm and designed to exert a pressure on a bead (6) and/or a wall (5) of the tire at a working point (B) of the tire.

The first articulation (C) is an articulation making it possible to bring the pressure element (13) closer to or further from the axis (Y). The first articulation (C) is for example a pivot, the axis of which is preferably substantially parallel to the axis (Y).

The second articulation (E) is an articulation making it possible to bring the pressure element (13) closer to or further from the central plane (PC). The second articulation (E) is for example a pivot, the axis of which is preferably substantially perpendicular to the axis (Y).

If the axis (Y) is vertical, the first articulation (C) is for example a pivot with a vertical axis and the second articulation (E) is for example a pivot with a horizontal axis.

In a yet more preferable manner, the axis of the second articulation (E) is substantially perpendicular to the tangential plane (PTA).

It should be understood that the point (A) is the control point, the point (B) is the controlled point, and the points (C) and (E) are the bearing points of the lever (12).

By virtue of such a configuration, the operator can, in a first step, pivot the lever (12) about the point (C) in order to bring the pressure element (13) closer to the axis (Y) until it is substantially at the vertical of its working point (B). He can then pivot the arm "EA" of the lever (12) about the point (E) to lower or raise the pressure element (13) to its working point (B) on respectively the top or bottom wall of the tire (1).

The operations for fitting and/or removing the tire by means of the lever (12) then take place as described for example in patent EP 909667.

Once the operation of fitting and/or removing the tire is complete, the operator can again pivot the lever about the points (C) and (E) in order to disengage the lever so as to be able to take the wheel off the table.

Instead of being actuated by an operator, the lever (12) can be actuated by a device generating a motive force such as for example a jack or a motor.

FIG. 1 also shows the various planes (radial plane: PR and tangential plane: PTA) and the four spatial quadrants (Q1,Q2, Q3,Q4) delimited by these planes and as defined above.

The point (C) must be in the first quadrant (Q1) or in the third quadrant (Q3), preferably in the first quadrant (Q1) as shown in FIG. 1.

When the pressure element (13) is in its working position (B) on the bead and/or the wall of the tire and the wheel is rotated, a friction force (F1) will develop between the tire and the pressure element. This force is substantially tangential relative to a circle formed by the rim edge (4).

Said friction force can be divided into three forces, as indicated in dashed lines in FIG. 1. The first force is cancelled out by a reaction to the bearing point (C) and/or (E). The second force is, in this example, directed downward and generates a torque which will tend to bring the pressure element (13) closer to the central plane (PC) by pivoting of the lever about the point (E). The third force is directed toward the axis (Y) and generates a torque which will tend to bring the pressure element (13) closer to the axis (Y) by pivoting of the lever about the point (C) (centripetal force).

These two resultant torques will therefore allow the operator (or the actuator) to need to exert less force on the lever (12) in order to keep the pressure element (13) in its working position during the fitting or removal of the tire (1).

FIG. 1 also shows an intermediate plane (PI) which comprises the point (B) and the point (C) and which is parallel to the axis (Y).

The point (C) is preferably positioned in the first quadrant (Q1) and so that the intermediate plane (PI) intersects the rim (2) at least one point (S), which allows the centripetal force to reach a certain amplitude.

Figures 2, 3:
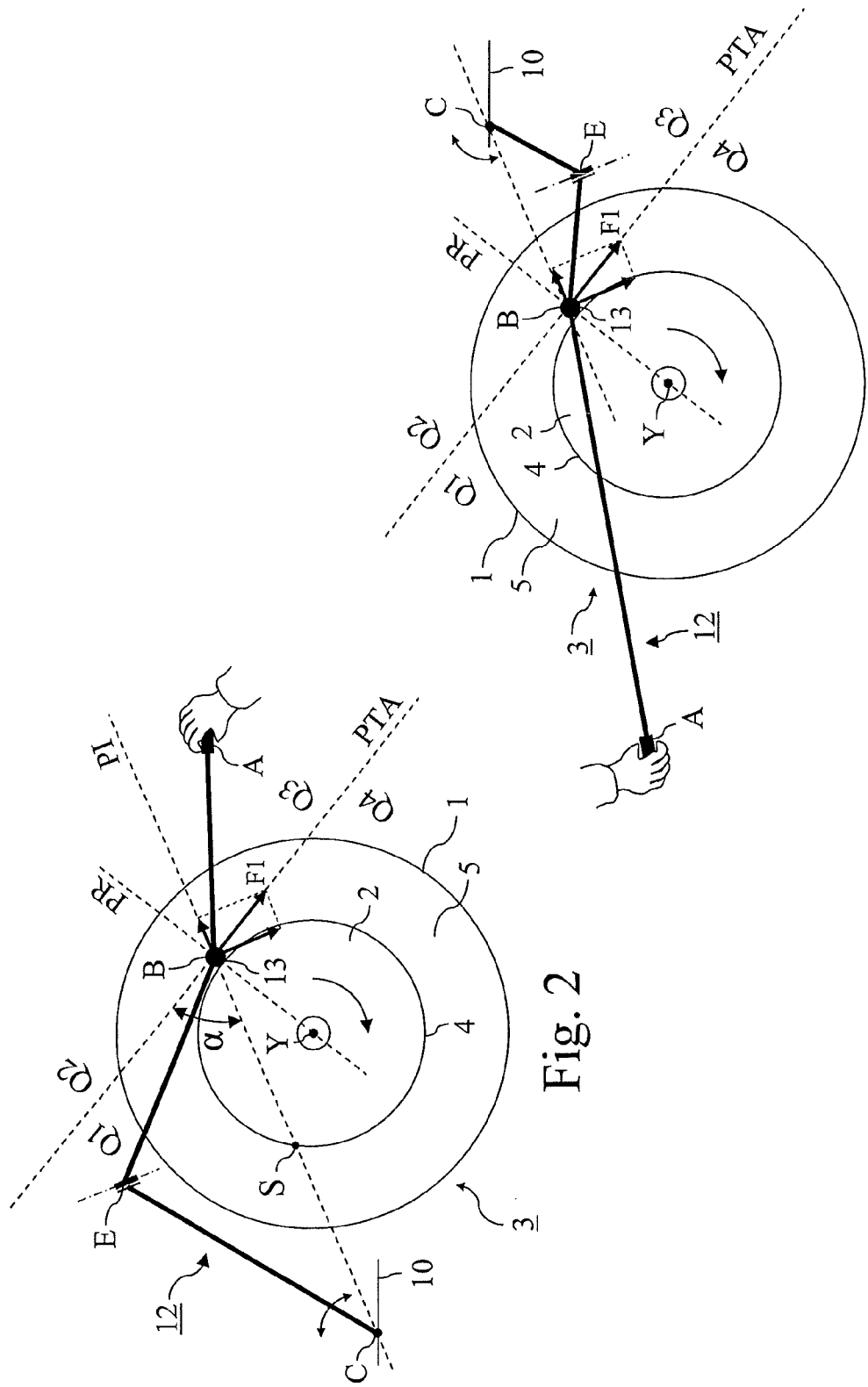
FIGS. 2, 3 show schematically a front view of two exemplary embodiments of a machine according to the invention.

FIG. 2 and FIG. 3 show schematically a front view of two exemplary embodiments of a machine according to the invention.

FIG. 2 shows an example in which the point (C) is situated in the first quadrant (Q1), so that the friction force (F1) is divided into a centripetal force and a force placing the lever (12) in tension.

It can be seen in FIG. 2 that a projection along the axis (Y) of the line segment BC in the second transverse plane (PTR2) forms an angle α (alpha) with the tangential plane (PTA). When the point (C) is in the first quadrant (Q1), the angle α (alpha) is therefore between 0 and 90 degrees. Preferably, the angle α is greater than or equal to 20 degrees, which allows the centripetal force to reach a certain amplitude. Preferably, the angle α is less than or equal to 45 degrees, which allows the centripetal force not to exceed a certain amplitude.

FIG. 3 shows an example in which the point (C) is situated in the third quadrant (Q3) (the quadrant opposite to the first quadrant (Q1)), so that the friction force (F1) is divided into a centripetal force and a force placing the lever (12) in compression.

FIG. 4 shows schematically a front view of a preferred embodiment of a machine according to the invention, the lever (12) being positioned so that the pressure element (13) is in its working position (B) between the rim edge (4) and the top wall (5) of the tire.

It can be seen therein that the second arm "EA" forms a broken line which allows the operator to stand at a greater distance from the wheel (3). It can also be seen therein that the first arm "CE" forms an angle of less than 180 degrees with the segment "EB" of the second arm and that the point (E) is outside a circle formed by the external diameter of the tire. In space, this means that, when the pressure element is in its working position (B), the point (E) is outside a cylinder (CY) of axis (Y) and comprising the tread of the tire. Therefore, the tire (1) will not be in the path of the lever when the pressure element (13) is placed in its working position (B) on the bead and/or the top wall and/or bottom wall of the tire.

Although not illustrated, it should also be understood that the arms "CE", "EB" and/or "BA" do not necessarily have to be straight. They may also for example be curved arms.

FIG. 4 also shows that the lever (12) is designed and connected to the frame (10) so that the working point (B) of the pressure element (13) is preferably situated slightly after a working position of the tool (30) for fitting/removing the tire (1) (the position to be considered along the edge of the rim (4) and in the normal direction of rotation of the wheel as indicated by the arrow on the wheel).

FIG. 5 shows schematically a view in partial section along the radial plane (PR) of a machine according to the invention when the pressure element (13) is in working position on the bead and/or the top wall of the tire (1). The pressure element (13) is preferably rounded in shape, for example a substantially spherical shape. The pressure element (13) is preferably made of a material softer than steel so as not to scratch the rim (2). Preferably, the pressure element (13) is mounted at a distance from the lever (12) by means of a rod (20). Said distance is chosen so that the arm "EA" does not touch the tire when the pressure element (13) is in its working position (B).

Figure 6:
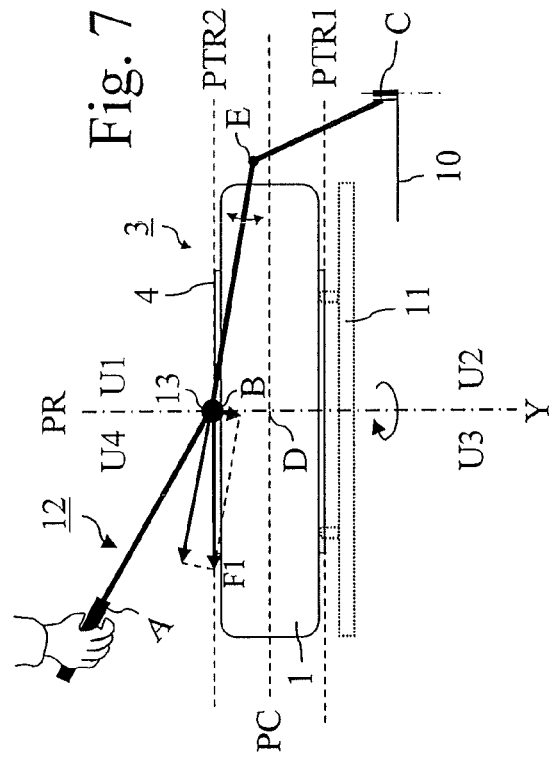
FIGS. 6, 7, 8 show schematically a profile view of several exemplary embodiments of a machine according to the invention.
Figure 7:
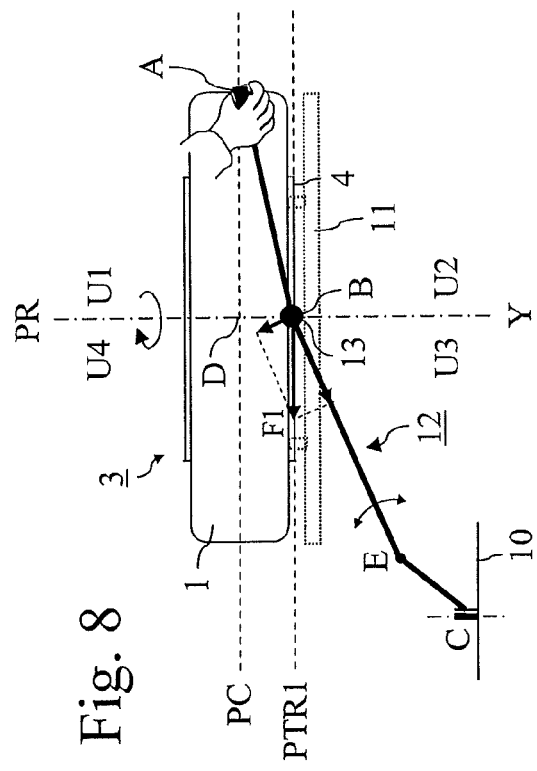
Figure 8:
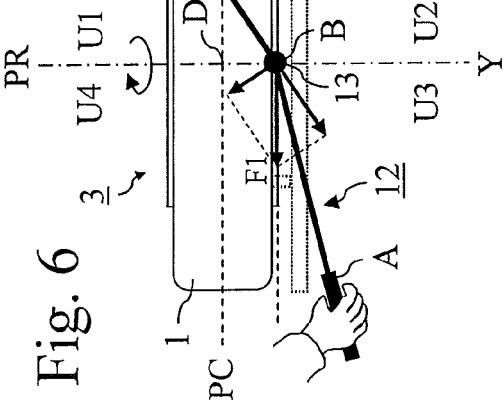

FIGS. 6, 7 and 8 show schematically a profile view of several exemplary embodiments of a machine according to the invention.

FIG. 6 shows an example in which the pressure element (13) is placed in a working position (B) on the bottom wall of the tire and in which the point (E) is situated in the first quadrant (U1), so that the friction force (F1) is divided into a force directed toward the central plane (PC) (in this instance therefore an ascending force) and a force placing the lever (12) in tension.

FIG. 7 shows a preferred example in which the point (E) is also situated in the first quadrant (U1) when the pressure element is in its working position (B), and in which the point (E) is furthermore situated on the side of the tire relative to the second transverse plane (PTR2). In this preferred case, the point (E) is therefore situated between the first transverse plane (PTR1) and the second transverse plane (PTR2) when the pressure element is in its working position (B). Therefore, when the pressure element (13) is placed in a working position (B) on the top wall of the tire, the friction force (F1) is also divided into a force directed toward the central plane (PC) (in this instance therefore a descending force) and a force placing the lever (12) in tension.

FIG. 8 shows an example in which the point (E) is situated in the third quadrant (U3) (the quadrant opposite to the first quadrant (U1)) when the pressure element is in its working position (B), so that the friction force (F1) is divided into a force directed toward the central plane (PC) and a force placing the lever (12) in compression.

It should be noted that, in the examples of FIGS. 6, 7 and 8, the point (C) may be anywhere and its position is therefore not limited to that indicated in said figures. Nevertheless, the point (C) is preferably in the first quadrant (Q1) or in the third quadrant (Q3). In a yet more preferred manner, the point (C) is in the first quadrant (Q1).

In a yet more preferred manner the point (C) is under the first transverse plane (PTR1) in order to be able if necessary to accommodate rims and/or tires of larger diameters.

Alternatively, the point (C) and the point (E) may be in reverse order along the lever (12), that is to say that, starting from the control point (A), we encounter first the articulation about the point (C), for example a vertical pivot, and then the articulation about the point (E), for example a horizontal pivot, the latter pivot being directly connected to the frame (10).

According to another embodiment of the machine according to the invention, the articulations (C) and (E) form only one articulation and it has at least two degrees of freedom in rotation, for example an articulation of the ball joint type. Preferably, this single articulation has two degrees of freedom in rotation, for example an articulation of the ball type with finger or a cardan joint. Preferably, said single articulation is in the first quadrant (Q1) and in the first quadrant (U1).

The present invention has been described with reference to specific embodiments which have a purely illustrative value and must not be considered limiting. In general, it will appear evident for those skilled in the art that the present invention is not limited to the examples illustrated and/or described above. The invention comprises each of the new features and all their combinations. The presence of reference numbers in the drawings cannot be considered limiting, comprising when these numbers are indicated in the claims.

The use of the verbs "to comprise", "to include", "to contain", or any other variant, and their conjugations, can in no manner exclude the presence of elements other than those mentioned.

The use of the indefinite articles "a", "one", or of the definite article "the" to introduce an element does not exclude the presence of a plurality of these elements.

To summarize, the invention can also be described as follows:

A machine for fitting and removing a tire (1) from a rim (2) of a wheel (3). The machine comprises a frame (10), a rotating table (11) for attaching the wheel to and for rotating the rim about its axis (Y) and a tool (30) for fitting and/or removing the tire from the rim. The machine also comprises a lever (12) to which a pressure element (13) is attached in order to push the bead (6) of the tire toward a circumferential recess of the rim. The lever (12) is connected to the frame (10) and comprises a first articulation in order to bring a pressure element (13) closer to or further from the axis (Y), and a second articulation in order to bring the pressure element (13) closer to or further from a central plane (PC) perpendicular to the axis (Y) and passing through the center (D) of the rim (2).

The first articulation is situated at a location such that the friction force of the tire on the pressure element (13) when the tire is in rotation will result in a centripetal force on the pressure element (13), thus reducing the force to be exerted on the lever (12).

The second articulation is situated at a location such that said friction force will result in a force on the pressure element (13) directed toward the central plane (PC), thus also reducing the force to be exerted on the lever (12).

The invention claimed is:

1. A machine for fitting and removing a tire (1) from a rim (2) of a wheel (3) comprising a frame (10), a table (11) capable of having the rim attached thereto and of rotating said rim in a centered manner about an axis (Y) and a lever (12) articulated on the frame (10), said lever (12) comprising a control point (A), a pressure element (13) for exerting a pressure on a bead (6) and/or a wall (5) of the tire at a working point (B) of the tire, a first articulation about a point (C) in order to bring the pressure element (13) closer to or further from the axis (Y), and a second articulation about a point (E) in order to bring the pressure element (13) closer to or further from a central plane (PC) perpendicular to the axis (Y) and passing through a center (D) of the rim, a radial plane (PR) comprises the axis (Y) and the point (B), a tangential plane (PTA) is parallel to the axis (Y), is perpendicular to the radial plane (PR) and comprises the point (B), the radial plane (PR) and the tangential plane (PTA) define four successive spatial quadrants (Q1,Q2,Q3,Q4) of which the first quadrant (Q1) is that immediately following the axis (Y) in the direction of rotation of the rim (2), wherein the point (C) is in the first quadrant (Q1) or in the third quadrant (Q3).

2. The machine as claimed in claim 1, wherein the point (C) is in the first quadrant (Q1).

3. The machine as claimed in claim 2, wherein an intermediate plane (PI) comprises the point (B) and the point (C) and is parallel to the axis (Y), wherein the intermediate plane (PI) intersects the rim (2) at least one point (S).

4. The machine as claimed in any one of claims 1 to 3, wherein, when the wheel (3) is attached to the table (11) and the pressure element (13) is in its working position (B), the point (E) is outside a cylinder (CY) with an axis (Y) and comprising the tread of the tire.

5. The machine as claimed in any one of claims 1 to 3, wherein the pressure element (13) is mounted at a distance from the lever (12) by means of a rod (20).

6. The machine as claimed in any one of claims 1 to 3, wherein a first transverse plane (PTR1) comprises a circle formed by a proximal rim edge and wherein the point (C) is situated beneath the first transverse plane (PTR1).

7. The machine as claimed in any one of claims 1 to 3, wherein the points (C) and (E) are indistinguishable and wherein the lever (12) is articulated on the frame (10) at this point with at least two degrees of rotational freedom.

8. The machine as claimed in any one of claims 1 to 3, wherein a first transverse plane (PTR1) comprises a circle formed by a proximal rim edge, the radial plane (PR) and the first transverse plane (PTR1) define four successive spatial quadrants (U1, U2, U3, U4) of which the first quadrant (U1) is that situated on one side of the center (D) of the rim (2) and on one opposite side to a friction force (F1) between the pressure element (13) and the tire (1) when the machine is in operation, wherein the point (E) is in the first quadrant (U1) or in the third quadrant (U3) when the pressure element is in its working position (B).

9. The machine as claimed in claim 8, wherein the point (E) is in the first quadrant (U1) when the pressure element is in its working position (B).

10. The machine as claimed in claim 9, in which a second transverse plane (PTR2) comprises a circle formed by a distal rim edge, wherein the point (E) is situated between the first transverse plane (PTR1) and the second transverse plane (PTR2).

11. The machine as claimed in claim 8, wherein the point (C) is situated beneath the first transverse plane (PTR1).

12. The machine as claimed in claim 8, wherein the points (C) and (E) are indistinguishable and wherein the lever (12) is articulated on the frame (10) at this point with at least two degrees of rotational freedom.

* * * * *